Nov. 4, 1947.  A. G. OBLAD ET AL  2,430,137
MANUFACTURE OF METHYLCYCLOHEXENES
Filed April 15, 1946
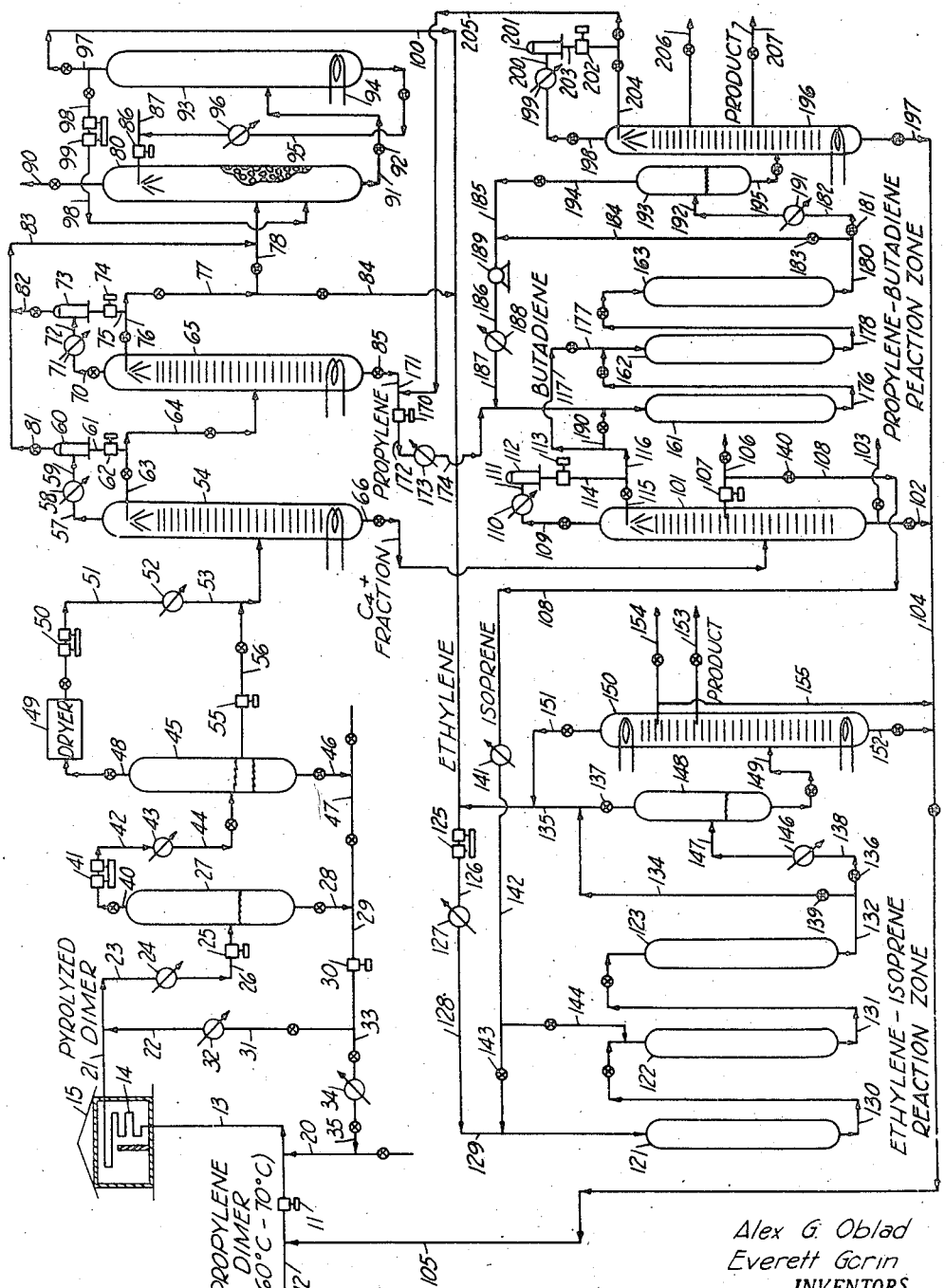
Alex G. Oblad
Everett Gorin
INVENTORS
BY John C. Stauffer
ATTORNEY Patented Nov. 4, 1947

2,430,137

UNITED STATES PATENT OFFICE 2,430,137

MANUFACTURE OF METHYLCYCLOHEXENES

Alex G. Oblad and Everett Gorin, Dallas, Tex., assignors, by mesne assignments, to Socony-Vacuum Oil Company, Incorporated, New York, N. Y., a corporation of New York Application April 15, 1946, Serial No. 662,155

6 Claims. (Cl. 260—666)

This invention relates to the conversion of aliphatic hexenes to methylcyclohexenes. More particularly, this invention relates to a process for the pyrolysis of propylene dimer polymers to form a mixture containing equimolar amounts of ethylene and isoprene and/or equimolar amounts of propylene and 1,3-butadiene, hereinafter sometimes referred to as butadiene, and the condensation of either or both of these olefin-diolefin pairs to form 1-methylcyclohexene-1 and/or 4-methylcyclohexene-1.

Heretofore it has been necessary to utilize elaborate fractionating equipment to segregate 1,3-butadiene and isoprene from associated hydrocarbons by absorptive fractionation in order to obtain these dienes in sufficiently high concentration to condense them with mono-olefins in the Diels-Alder type reaction. Thus, an aqueous solution of cuprous ammonium acetate has been used to obtain relatively pure 1,3-butadiene from a mixture containing other C₄ hydrocarbons. It is highly desirable to obtain isoprene and 1,3-butadiene free of associated hydrocarbons which interfere in the condensation reaction with specific olefins, by simple distillative fractionation, in order to be able to carry on the condensation reaction and the cooperating production of olefin and diolefin intermediates on a continuous basis.

It is known in the art to pyrolyze propylene polymers to produce dienes. For example, U. S. Patent 2,339,560, issued to Martin DeSimo et al., teaches such a process. However, relatively low yields of pentadienes are produced when pyrolyzing such a mixture. According to the method of the present invention only the more desirable dienes are produced and these are recovered by simple distillative fractionation.

It is an object of this invention to produce methylcyclohexenes. Another object is to manufacture methylcyclohexenes from a selected cut of propylene dimer in a continuous process which employs a minimum of fractionating equipment. A further object of this invention is to convert a selected fraction of propylene dimer to a mixture consisting substantially of 1,3-butadiene, isoprene, ethylene, and propylene in stoichiometric proportions suitable for the production therefrom of 4-methylcyclohexene-1 and 1-methylcyclohexene-1. Other objects of the invention will appear hereinafter.

We have found that isoprene and 1,3-butadiene of suitable purity for condensation with ethylene and propylene can be produced by pyrolizing a selected cut of propylene polymer. In our process, we pyrolyze that part of the propylene polymer which yields a product the C₅ fraction of which contains a relatively high per cent of isoprene. The C₄ fraction of the product contains a relatively high per cent of 1,3-butadiene associated with a minor amount of isobutylene which does not react with the butadiene and hence does not interfere with the condensation of the butadiene with propylene. We exclude from the pyrolysis step those components of the propylene polymer which yield other dienes. The stoichiometric quantities of ethylene and isoprene components of the pyrolyzed product are condensed to form 1-methylcyclohexene-1 and the substantially equal molecular quantities of propylene and 1,3-butadiene components are condensed to form 4-methylcyclohexene-1 in separate cooperating Diels-Alder type condensation steps of the process.

Propylene dimers may be divided into two groups of compounds. The first group consists predominantly of 2-methylpentene-2, with smaller amounts of 2-methylpentene-1 and 3-methylpentene-2, and constitutes the 60° C.-to-70° C. fraction of the dimer. The second group comprising the remainder of the dimers contains such compounds as 3-methylpentene-1, 4-methylpentene-1, and smaller amounts of other hexenes. We have found that the pyrolysis of the first group of compounds results predominantly in the production of isoprene in the C₅ fraction and predominantly 1,3-butadiene in the C₄ fraction of the cracked dimers. The pyrolysis of the remaining components of the dimer results largely in the production of light olefins and only a relatively small amount of isoprene and butadiene. The pyrolysis of the first group of compounds results in the production of ethylene and propylene in molecular proportions substantially equivalent to the isoprene and 1,3-butadiene respectively in the product.

As indicated above, feed to our process consists of that fraction of propylene dimer which is predominantly 2-methylpentene-2 although smaller amounts of 3-methylpentene-2 and 2-methylpentene-1 are also present. The polymerization of propylene to produce a dimer consisting in large part of these components may be carried out over catalysts of the alumina-silica type or in the presence of a dilute aqueous solution of phosphoric acid. The liquid product from the polymerization step is fractionated and fraction boiling between 60° C. and 70° C. is pyrolyzed at a temperature within the range of from about 750° C. to about 850° C., preferably within the range of from about 775° C. to 825° C. at a contact time within the range of from 0.005 second to about 2.0 seconds. Contact time is determined by dividing the volume of the reaction space by the volume of reactants charged per second measured as a gas under standard conditions of temperature and pressure. The pyrolysis reaction is preferably carried out at partial pressures of the dimer below atmospheric pressures, that is, down to a pressure of 0.1 atmosphere partial pressure of the dimer feed. The total pressure in the pyrolysis zone should be within the range of from about 1 atmosphere to about 3 atmospheres gage. A diluent such as steam is incorporated with the feed to reduce the partial pressure of the polymer to the desired level.

The product from the pyrolysis zone is rapidly quenched to temperatures below 300° C. The product is fractionated to obtain separate streams containing ethylene, propylene, 1,3-butadiene, and isoprene. The ethylene and isoprene streams are passed to a condensation zone which may consist of any suitable type reactor or which may consist of a multiplicity of reactors in series wherein 1-methylcyclohexene-1 is produced. The streams of propylene and butadiene are passed to a similar but separate condensation zone wherein 4-methylcyclohexene-1 is produced. The condensation reactors are maintained at temperatures within the range of from about 300° C. to about 375° C., preferably from about 315° C. to 350° C. An internal ratio of mono-olefin to diene of at least 5 to 1 to 30 to 1 or higher is maintained in the condensation reactor.

The total residence time of the mono-olefin-diene mixture in the condensation reaction zone, that is, the contact time of isoprene with ethylene and the contact time of 1,3-butadiene with propylene, is a function of the temperature and the pressure; that is, the residence time should be shorter the higher the temperature and pressure. When operating the condensation reactors at temperatures of from about 350° to about 375° C., pressures of from about 70 to 150 atmospheres are suitable and the residence time of the mono-olefin-diene mixture in the series of reactors will be within the range of from about 6 minutes to about 20 minutes. On the other hand, when temperatures within the range of from about 300° C. to 325° C. are maintained in the condensation zone, higher pressures within the range of from about 175 to about 275 atmospheres are suitable. Residence times when operating in the lower temperatures range will be within the range of from about ½ hour to 5 hours. When operating the condensation process at intermediate temperatures, pressures and residence times between these extremes should be used. In general, the condensation of propylene with 1,3-butadiene requires somewhat longer residence time to obtain substantially complete condensation of the dimer with the mono-olefin in a single pass through the series of reactors.

The products from the respective condensation zones are passed to fractionators for separation of the methylcyclohexenes from diene polymers, ethylene, and propylene, and unreacted components of the $C_4$ and $C_5$ fractions. Usually the products from the condensation zones contain little or no unreacted dienes. The product from the butadiene-propylene condensation reactors contains some isobutylene. For the better understanding of our invention reference may be made to the drawing which forms a part of this specification and represents diagrammatically one form of apparatus suitable for effecting the process of the invention.

Turning now to a detailed consideration of the drawing, the liquid charge which consists of the 60° C.-to-70° C. fraction of propylene dimer is introduced to the process by means of pump 11 in line 12. The 60° C.-to-70° C. fraction is passed through line 13 to coil 14 in furnace 15. An inert diluent such as water or steam is introduced to line 13 from line 20. The amount of diluent added to line 13 should be sufficient to maintain the partial pressure of propylene dimer in coil 14 below atmospheric pressure. The temperature of the stream of vaporized dimer in coil 14 preferably should be maintained within the range of from about 775° C. to about 825° C. The mixture of dimer and steam is fed to coil 14 at a rate to give a contact time within the limits of 0.005 and 2.0 seconds, preferably within the range of from about 0.05 to about 0.5 second. The product passes from coil 14 to line 21 and is quenched to a temperature below 300° C. with water introduced to line 21 through line 22. The quenched pyrolyzed product passes through line 23 to condenser 24 where the major portion of the water is separated from the hydrocarbon product and the mixture is passed by means of pump 25 in line 26 to separator 27.

Separator 27 is maintained at a temperature within the range of from about 50° C. to about 75° C. and at a pressure up to 2 atmospheres, preferably about atmospheric. Water which is condensed from the pyrolyzed product is withdrawn from separator 27 through line 28 which leads to line 29. If desired, the liquid condensate from separator 27 may be sent to a tar separator (not shown) for the separation of higher boiling material produced in pyrolysis coil 14. A part of this water is passed by means of pump 30 through line 31 to cooler 32 and thence by line 22 to line 21 to be reused as quench water. The remainder of the water in line 29 is passed through line 33 to heater 34 and thence by line 35 to line 20 which joins line 13. This water may be introduced to line 13 in the form of water or steam to act as a diluent of the hydrocarbon passing to coil 14.

The gaseous products separated in separator 27 pass overhead through line 40 and are pressured by means of compressor 41 to about 200 pounds per square inch. The product passes through line 42 to cooler 43 and thence through line 44 to separator 45 where additional water, undecomposed hexenes, and a part of the $C_5$ fraction of the pyrolyzed mixture are separated as condensate from the lighter product. The hydrocarbon condensate forms as a liquid layer superimposed on the water condensate in separator 45. Water is recycled from the bottom of separator 45 through lines 46, 47, and 29. Noncondensed gaseous product passes from separator 45 through line 48 to drier 49 where the last traces of water vapor are removed from the product. Substantially water-free product vapors from drier 49 are picked up by means of compressor 50 in line 51, which leads to partial condenser 52 where the major portion of the hydrocarbon vapors is condensed. The mixture of vapors in the hydrocarbon condensate passes from condenser 52 through line 53 to fractionator 54. Liquid hydrocarbon condensate in separator 45 is passed by means of pump 55 in line 56 to line 53 and is thus made a part of the feed stream passing to fractionator 54.

Fractionator 54 serves to separate the $C_3$ hydrocarbons and lower boiling hydrocarbons from the $C_4$ hydrocarbons and higher boiling hydrocarbons. Fractionator 54 is operated at a pressure within the range of from about 400 to 450 pounds per square inch. $C_3$ and lower boiling hydrocarbons pass overhead from fractionator 54 through line 57 to condenser 58 and thence through line 59 to reflux accumulator 60. The overhead product from fractionator 54 consists of about 2 moles of propylene and $C_2$ hydrocarbons, a major portion of which $C_2$ hydrocarbons is ethylene, for each 3 moles of methane and hydrogen. A major proportion of the lighter product is methane. Liquid condensate in accumulator 60, which contains propylene and a part of the ethylene, is withdrawn through line 61 by means of pump 62. A part of this condensate is passed through line 63 to be used as reflux in fractionator 54, and the remainder is passed through line 64 to fractionator 65. The C$_4$ and higher boiling hydrocarbons are withdrawn from the bottom of fractionator 54 through line 66. Propylene is separated from the C$_2$ hydrocarbon in fractionator 65, which is operated at a pressure within the range of from about 450 to 500 pounds per square inch. The C$_2$ hydrocarbons consisting of at least 80 per cent ethylene and a part of the methane of the pyrolyzed product pass overhead from fractionator 65 through line 70 to condenser 71 and thence through line 72 to reflux accumulator 73. At least a part of the condensate which consists primarily of ethylene is passed from accumulator 73 by means of pump 74 in line 75 through line 76 to be used as reflux in fractionator 65. The remainder of the liquid condensate from accumulator 73 may be vaporized in condensers 58 and/or 71 in order to provide cooling means for the condensation of the light gases from the fractionators 54 and/or 65, and the vaporized condensate is then passed through lines 77 and 78 to ethylene recovery tower 80. The gaseous streams from the accumulators 60 and 73 which comprise methane, hydrogen, and a part of the ethylene pass overhead through lines 81 and 82 which lead to line 78 by way of line 83. Thus, we recover in tower 80 any ethylene which is not condensed in the accumulators. If desired, a part of the ethylene stream in line 77 may be sent directly through line 84 to line 100 through which substantially pure ethylene is passed to the ethylene-isoprene condensation step of the process. Liquid propylene is withdrawn from the bottom of tower 65 through line 85 and is passed to the propylene-butadiene condensation step described hereinbelow.

The stream of light hydrocarbon gases and hydrogen in line 78 will contain from about 25 mole per cent to about 50 or 55 mole per cent of ethylene. In tower 80 which may suitably be packed with inert packing material, the stream of gas from line 78 is contacted at a temperature of from about 5° to 35° C. with an aqueous solution containing cuprous chloride introduced to tower 80 by means of pump 86 in line 87. Contact of the gas with this solution is made at pressures within the range of from about 3 atmospheres to about 30 atmospheres. The use of an aqueous solution of cuprous chloride for absorbing ethylene from a gas stream is described by Gilliland and Seebold in "Industrial and Engineering Chemistry," vol. 33, September, 1941, pages 1143–1147. The solution should contain about 3 gram moles of ammonium chloride per liter, approximately 2.5 gram moles hydrogen chloride, and approximately 2 gram moles of cuprous chloride. Such a solution is particularly adaptable for the removal of ethylene from a pyrolyzed hydrocarbon stream since unstable copper acetylides are not formed in strong acid solution of the cuprous chloride. As the solution flows downward over the packing in tower 80, the ethylene is absorbed from the gas, and the nonabsorbed gases pass overhead through line 90.

The ethylene enriched solution is withdrawn from tower 80 through line 91 and pressure release valve 92 and passes thence to desorption tower 93. The ethylene is desorbed from the solution by reduction of pressure on the solution and/or by the application of heat to the solution by means of steam coil 94 in the bottom of tower 93. Desorbed cuprous chloride solution is recycled from the bottom of tower 93 through line 95, which leads to line 87. Solution cooler 96 is installed in line 95 in order to maintain the temperature of the solution within the range of 5° C. to 35° C. A relatively pure ethylene stream passes overhead from tower 93 through line 97, which joins line 100 leading to the ethylene-isoprene condensation step of our process. If desired, a part of the relatively pure ethylene stream may be diverted through line 98 by means of compressor 99 and introduced near the bottom of tower 80. The introduction of pure ethylene to tower 80 below the point of introduction of the impure ethylene stream serves to strip the solution of any absorbed propylene and substitute therefor absorbed ethylene.

Returning now to the description of the fractionation of the C$_4$+ of hydrocarbons recovered from tower 54, the stream of hydrocarbons in line 66 is passed to fractionator 101 which is operated at a pressure of from about 5 atmospheres to about 10 atmospheres gage. The C$_6$ and higher boiling fraction consisting substantially of undecomposed propylene dimer, that is, usually at least 50 mole per cent of undecomposed dimer, is withdrawn from tower 101 through bottom draw-off line 102. A part of this fraction may be removed from the process through line 103; however, we prefer to recycle this fraction through lines 104 and 105 to line 12. A C$_5$ fraction containing at least 90 mole per cent of isoprene is withdrawn as a side stream from fractionator 101 through line 106 by means of pump 107. The major part of this isoprene stream is passed through line 108 to the ethylene-isoprene condensation zone described hereinbelow.

The overhead product from tower 101 which consists of C$_4$ hydrocarbons comprising a major proportion of 1,3-butadiene and a minor proportion of isobutylene passes through line 109 to condenser 110 and thence through line 111 to reflux accumulator 112. The liquid condensate from accumulator 112 is removed therefrom by means of pump 113 in line 114. A part of this liquid stream is diverted through line 115 to be used as reflux in tower 101. The remainder of this liquid stream is passed through line 116 which connects with manifold feed line 117. Manifold line 117 supplies butadiene to the propylene-butadiene condensation reactors described hereinafter. If desired, an inhibitor such as aniline may be added to the butadiene stream in line 116 and to the isoprene stream in line 108 by lines not shown in the drawing in order to inhibit the oxidation and/or polymerization of the dienes.

The condensation apparatus wherein ethylene and isoprene are condensed to form 1-methylcyclohexene-1 may suitably consist of a multiplicity of high pressure reactors connected in series with the ethylene feed stream and in parallel with the isoprene feed stream. These reactors are represented by chambers 121, 122, and 123 respectively. Ethylene is picked up by compressor 125 in line 126 which joins line 100. The compressed gas is passed through heater 127 where it is heated preferably to a temperature within the range of from about 315° C. to 350° C. The heated gas passes through lines 128 and 129 to reactor 121. The ethylene is circulated through the reactor system in order to introduce a high concentration of ethylene therein before introduction of the isoprene. The gas passes from reactor 121 through line 130 to reactor 122 and thence through line 131 to reactor 123. From reactor 123 the ethylene stream passes through line 132, valved line 134, and line 135 to line 126, valves 136 and 137 in lines 138 and 135 respectively being closed. When the reactor system has been heated and pressured, valve 139 in line 134 is closed and valves 136 and 137 are placed in the open position. Valve 140 in line 108 is then opened and isoprene is passed to heater 141 wherein the temperature of the isoprene is raised to about 100° C. and the stream of warm isoprene passes through line 142 and valve 143 to line 129 where it is injected into the stream of hot ethylene gas, passing to reactor 121.

We maintain an ethylene-to-isoprene ratio of at least 5 to 1 in reactors 121, 122, and 123. The ratio increases as the reaction mixture passes through the series of reactors. The temperature in the reactors is maintained within the range of from about 300° C. to about 375° C. Pressures in the reactors may be from about 70 atmospheres to about 300 atmospheres, preferably about 150 atmospheres.

The average residence time of the ethylene-isoprene mixture in reactor 121, when operated at 315° C. and about 150 atmospheres pressure, is within the range of from about 30 minutes to about 90 minutes. The reaction mixture passes as a continuous stream to reactor 122 to which additional isoprene is added from line 144 which leads from line 142 and connects with line 130. The average residence time of the reaction mixture in reactor 122, which is maintained at approximately the same temperature and pressure as reactor 121, is within the range of from about 15 minutes to about 60 minutes. The reaction mixture passes through line 131 to reactor 123 which is maintained at about the same temperature and pressure as reactors 121 and 122. The average residence time of the reaction mixture in reactor 123 is within the range of from about 10 minutes to about 40 minutes or for a sufficient time to complete substantially the reaction of isoprene in the mixture. The last reactor of the series of reactors serves as a reaction zone in which residual isoprene is reacted and hence additional isoprene is not added to the product stream in line 131.

The reaction mixture passes from reactor 123 through lines 132 and 138 to partial condenser 146 wherein C5 hydrocarbons, 1-methylcyclohexene-1, and isoprene polymer are condensed from the gaseous mixture. Since the isoprene is substantially completely condensed to the methylcyclohexene or to isoprene polymer, the amount of C5 hydrocarbons in the product is relatively small. The mixture of ethylene gas and liquid product passes through line 147 to gas separator 148. Ethylene is recycled from separator 148 through line 135 to line 126. Liquid condensate from separator 148 passes through line 149 to fractionator 150.

Fractionator 150 is operated at from about 5 to about 10 atmospheres for the separation of the liquid product from residual ethylene which passes overhead through lines 151 and 135 to line 126. The dimer of isoprene is withdrawn from fractionator 150 through line 152 which connects with recycle line 105. The dimer passes from line 105 to line 12 and thence through line 13 to pyrolysis coil 14 in furnace 15 wherein it is cracked to produce isoprene. Relatively pure 1-methylcyclohexene-1 product is withdrawn from fractionator 150 through line 153. A relatively small C5 stream consisting substantially of pentenes and pentanes is also withdrawn from fractionator 150 trap-out line 154. If desired, this stream which may contain a small amount of isoprene may be recycled to coil 14 through lines 155, 104, 105 and 13.

Turning now to the step of the process wherein propylene is condensed with butadiene, the condensation reactors are represented by chambers 161, 162, and 163. These reactors are operated under the same conditions of temperature, pressure, and residence times as reactors 121, 122, and 123. Propylene from line 85 is passed by means of pump 170 in line 171 through line 172 to heater 173 where the propylene is raised in temperature to at least 300° C. The propylene vapor at a pressure of about 100 atmospheres passes through line 174 to reactor 161. The heated vapor is circulated through the series of reactors in order to make provision for a relatively high ratio of propylene to butadiene in the reactor system. The mole ratio of propylene to butadiene in reactor 161 should be at least 5 to 1 and the ratio may be as high as 30 to 1 or higher in reactors 161, 162, and 163. The hot propylene gas passes from reactor 161 through lines 176 and 177 to reactor 162 and thence through line 178 to reactor 163. With valve 181 in line 182 closed and valve 183 in line 184 open, the hot propylene gas is circulated from reactor 163 through lines 180, 184, 186, 187, and 174, and heater 188 by means of blower 189.

Valve 181 in line 182 is now placed in the open position, valve 183 in line 184 is closed, and liquid 1,3-butadiene from line 116 is introduced to the propylene stream through lines 117, 177, and 190. The ratio of propylene to 1,3-butadiene tends to increase as the mixture of gases passes through the series of reactors and hence 1,3-butadiene is introduced to each of the two reactors in order to maintain a sufficiently high ratio of butadiene to propylene to obtain reasonably high reaction rates. On the other hand, the ratio of propylene to 1,3-butadiene should be relatively high in order to prevent the formation of butadiene dimer.

The reaction mixture passes in series through reactors 161 and 162 wherein a major proportion of the butadiene reacts with a part of the propylene to form 4-methylcyclohexene-1. A part of the butadiene is converted to butadiene dimer. The mixture then passes through line 178 to reactor 163. Reactor 163 serves as a cleanup reaction zone wherein any residual butadiene in the reaction mixture is converted to 4-methylcyclohexene-1. Hence, additional butadiene is not added to this reactor which represents the last reactor of the series of reaction zones.

The reaction product consisting substantially of propylene, 4-methylcyclohexene-1, butadiene dimer, and isobutylene passes from reactor 163 through lines 180 and 182 to partial condenser 191 which is maintained at such a temperature that substantially all of the product except unreacted propylene is condensed. The condensed product passes from condenser 191 through line 192 to separator 193. Gaseous propylene is recycled through line 194 which connects with line 185. The liquid product from separator 193 passes through line 195 to fractionator 196.

Fractionator 196 is operated at a pressure from about 150 to about 250 pounds per square inch. Butadiene dimer is withdrawn from the bottom of fractionator 196 through line 197 and is recycled through lines 104, 105, 12, and 13 to coil 14 in furnace 15. Propylene is withdrawn as overhead through line 198 and passes to condenser 199 and thence through line 200 to reflux accumulator 201. Condensate in the accumulator 201 is passed in part by means of pump 202 in line 203 through line 204 to serve as reflux in tower 196. The remainder of the propylene is recycled through line 205 which connects with line 171. Isobutylene is withdrawn as a side stream from tower 196 through line 206. The 4-methylcyclohexene is withdrawn through line 207.

Example 1 illustrates the polymerization of propylene and pyrolysis of the 60° C.–70° C. fraction of the product to yield isoprene, 1,3-butadiene, ethylene, and propylene.

EXAMPLE 1

Propylene was dimerized by passing the olefin over alumina silica catalyst of the Gayer type at a temperature of 360° C. and at a 40-pound gage pressure. A space velocity of about 230 volumes (S. T. P.) of propylene per volume of catalyst space per hour was maintained to give a yield of 45.8 per cent of dimer based on the propylene converted. Approximately 42.8 per cent of the propylene feed was converted to polymer.

The dimer consisted mainly of 2-methylpentenes of which 2-methylpentene-2 predominated. Boiling range of the dimer was approximately 50° C. to 75° C. This material was fractionated to produce a 60°-to-70° C. fraction which represented approximately 80 per cent of the dimer and 36.7 per cent of the total polymer produced.

The above 60°-to-70° C. fraction of the dimer was diluted to 10 volume per cent with nitrogen and pyrolyzed at 800° C. under approximately atmospheric pressure and at a contact time of 0.05 second. Under these conditions, 71.3 per cent of the dimer was decomposed. The volume per cent of the various products in the effluent and their yields are given in the table below.

Table

| Component | Vol. per cent N$_2$ Free Effluent Gas | Moles/100 Moles Dimer Decomposed |
| --- | --- | --- |
| H$_2$ | 3.7 | |
| CH$_4$ | 30.7 | 83.8 |
| C$_2$H$_4$ | 15.0 | 41.1 |
| C$_2$H$_6$ | 2.3 | 6.3 |
| C$_3$H$_6$ | 4.8 | 13.2 |
| iC$_4$H$_8$ | 3.2 | 8.7 |
| Butadiene, C$_4$H$_6$ | 5.2 | 14.3 |
| Isoprene, C$_5$H$_8$ | 17.1 | 46.7 |
| C$_5$H$_{10}$+C$_5$H$_{12}$ | 0.9 | 2.5 |
| C$_6$H$_{12}$ | 14.8 | |
| C$_7$+ | 2.3 | 6.3 |
| | 100.0 | |

It is to be noted that the yield of isoprene per 100 moles of dimer decomposed was 46.7 moles. The yield of ethylene with which we condense the isoprene to form 1-methylcyclohexene-1 was 41.1 moles per 100 moles dimer decomposed. The yields of 1,3-butadiene and propylene which we condense to form 4-methylcyclohexene-1 were 14.3 and 13.2 respectively.

Example 2 illustrates the step of the process wherein 1,3-butadiene is condensed with propylene.

EXAMPLE 2

A mixture containing propylene and butadiene in the ratio of about 5.6 moles of propylene to 1 mole of butadiene, and also a small amount of aniline inhibitor was heated in an autoclave at a temperature of about 300° C. for a period of 2 hours. The pressure at 300° C. operating temperature was about 143 atmospheres. The analysis of the product indicated that 23.8 per cent of the butadiene charged was converted to 4-methylcyclohexene-1. The boiling point of 4-methylcyclohexene-1 fraction was 102.5° C. The index of refraction, $n_D^{25}$, of the methylcyclohexene product was 1.4390. The 1,3-butadiene dimer produced amounted to 63.6 per cent of the butadiene charged. The remainder of the butadiene, that is, 12.6 per cent of the butadiene charged was converted to a higher boiling polymer.

Example 3 illustrates the step of the process wherein isoprene is condensed with ethylene to form 1-methylcyclohexene-1.

EXAMPLE 3

A mixture consisting of 88.9 mole per cent of ethylene and 11.1 mole per cent of isoprene was heated at a temperature of about 320° C. in an autoclave at a pressure of about 132 atmospheres for a period of one hour. Upon analysis of the product it was found that 53.6% of the isoprene charged was converted to 1-methylcyclohexene-1 having a boiling point of 111° C. (760 mm.) and an index of refraction ($n_D^{20}$) of 1.4500. The amount of unreacted isoprene amounted to 26.8% of the isoprene charged. About 20% of the isoprene was converted to isoprene polymer which consisted in large part of isoprene dimer. About 90% of the ethylene charged was recovered as unreacted ethylene. The remainder of the ethylene charged reacted with the isoprene to form 1-methylcyclohexene-1 and a small amount of ethylene polymer.

To recapitulate, our invention is particularly concerned with the method of preparing reactants for the production of 1-methylcyclohexene-1 and 4-methylcyclohexene-1 from propylene and/or propylene dimer. We pyrolyze the 60° C.-to-70° C. fraction of the propylene dimer under conditions of temperature, pressure, and contact time such that the product stream will contain substantially equimolecular amounts of isoprene and ethylene, and also substantially equimolecular amounts of 1,3-butadiene and propylene. These reactants are present in the pyrolyzed product stream in sufficient concentration to make possible their recovery and use in the condensation reactions to produce the methylcyclohexenes without the expenditure of large sums of money for fractionating equipment. The isoprene is present to the extent of at least 90 mol per cent in the C$_5$ fraction of the pyrolyzed product. This makes possible the separation by distillative fractionation of isoprene of sufficient purity for condensation with ethylene. The 1,3-butadiene is present to the extent of at least 55 or 60 per cent of the C$_4$ fraction of the pyrolyzed product, the other component being isobutylene. Isobutylene does not condense with 1,3-butadiene in the Diels-Alder type condensation and hence the presence of the isobutylene does not interfere with the reaction of 1,3-butadiene with propylene in the formation of 4-methylcyclohexene-1.

It will be understood that the flow diagram presented is merely illustrative of the possibilities and other alternatives will be apparent to those skilled in the art in the light of this description, and that our invention is not to be restricted to the details shown. Thus, we may use a smaller number or greater number of reaction chambers in the condensation step of our process. On the other hand, it will be understood that this flow diagram is simplified for the purpose of convenience and that additional items such as pumping and compressing equipment, heat exchange equipment, control devices, and various other details are not indicated.

We claim:

1. The continuous process for the manufacture of 1-methylcyclohexene-1 and 4-methylcyclohexene-1 from propylene which comprises the steps of (1) catalytically polymerizing propylene under conditions of temperature and pressure to form predominantly propylene dimer, (2) fractionating the product of step 1 to obtain a fraction boiling within the range of from 60° C. to 70° C., (3) pyrolyzing the 60° C.-to-70° C. fraction of step 2 under conditions of temperature, pressure, and contact time to obtain a product stream containing substantially equimolecular quantities of isoprene and ethylene and containing substantially equimolecular quantities of 1,3-butadiene and propylene, (4) fractionating the product stream of step 3 to obtain separate hydrocarbon streams containing isoprene, 1,3-butadiene, ethylene, and propylene, (5) thermally condensing the isoprene and ethylene of step 4 in a reaction zone to obtain a product stream containing 1-methylcyclohexene-1, (6) thermally condensing the 1,3-butadiene and propylene of step 4 in a separate reaction zone to obtain a product stream containing 4-methylcyclohexene-1, and (7) fractionating the product streams of steps 5 and 6 to recover 1-methylcyclohexene-1 and 4-methylcyclohexene-1.

2. The process for the manufacture of 1-methylcyclohexene-1 and 4-methylcyclohexene-1 which comprises the steps of (1) fractionating propylene polymer to obtain a fraction boiling in the range of from 60° C. to 70° C., (2) pyrolyzing the 60° C.-to-70° C. fraction of step 1 under conditions of temperature, pressure, and contact time to obtain a product stream containing substantially equimolecular quantities of isoprene and ethylene and containing substantially equimolecular quantities of 1,3-butadiene and propylene, (3) fractionating the product stream of step 2 to obtain separate hydrocarbon streams containing isoprene, 1,3-butadiene, ethylene, and propylene, (4) continuously passing the isoprene and ethylene containing streams of step 3 through a series of reaction chambers to form a product stream containing 1-methylcyclohexene-1, (5) continuously passing the streams containing propylene and 1,3-butadiene through a second series of reaction chambers to form a product stream containing 4-methylcyclohexene-1, and (6) recovering said 1-methylcyclohexene-1 and 4-methylcyclohexene-1 from the product streams of steps 4 and 5 of the process.

3. The continuous process for the manufacture of 1-methylcyclohexene-1 and 4-methylcyclohexene-1 which comprises (1) continuously pyrolyzing the 60° C.-to-70° C. fraction of propylene dimer at a temperature within the range of from about 750° C. to about 850° C. at a partial pressure of said dimer fraction less than one atmosphere and at a contact time within the range of from about 0.005 to about 2.0 seconds, (2) fractionating the product of step 1 to obtain separate hydrocarbon streams consisting in major part of ethylene, propylene, 1,3-butadiene, and isoprene, (3) continuously passing to a reaction zone the ethylene- and isoprene-containing streams of step 2 and forming therein a product stream containing 1-methylcyclohexene-1, (4) continuously passing to a second reaction zone the propylene- and 1,3-butadiene-containing streams of step 2 and forming therein a product stream containing 4-methylcyclohexene-1, (5) fractionating the product streams of steps 3 and 4 to obtain separate streams consisting substantially of ethylene, propylene, 1-methylcyclohexene-1, 4-methylcyclohexene-1, and a polymer of 1,3-butadiene, (6) recycling the ethylene stream of step 5 to step 3 and the propylene stream of step 5 to step 4, (7) recycling the polymer of step 5 to step 1 of the process, and (8) continuously recovering 1-methylcyclohexene-1 and 4-methylcyclohexene-1 from step 5 of the process.

4. The continuous process for the manufacture of 1-methylcyclohexene-1 and 4-methylcyclohexene-1 which comprises the steps of (1) fractionating a propylene dimer to obtain therefrom a fraction consisting of a mixture of hexenes boiling in the range of from 60° C. to 70° C., (2) pyrolyzing the 60° C.-to-70° C. fraction of step 1 in a heating zone at a temperature within the range of from about 750° C. to about 850° C., (3) separating from the product of the heating zone of step 2 by distillative fractionation at least four fractions comprising a fraction containing hydrogen, methane, ethylene and ethane, a C3 hydrocarbon fraction consisting substantially of propylene, a C4 hydrocarbon fraction containing a major proportion of 1,3-butadiene, and a C5 hydrocarbon fraction consisting substantially of isoprene, (4) separating ethylene from the ethylene-containing fraction of step 3, (5) continuously passing the ethylene from step 4 and the C5 hydrocarbon fraction of step 3 through a reaction zone at conditions of temperature pressure and contact time adjusted to condense the isoprene content of said C5 fraction with said ethylene, (6) continuously passing the C3 and C4 hydrocarbon fractions of step 3 through a separate reaction zone at conditions of temperature, pressure, and contact time adjusted to condense the propylene of the C3 fraction with the 1,3-butadiene of the C4 fraction, (7) recovering 1-methyl-cyclohexene-1 from the product of the reaction zone of step 5, and (8) recovering 4-methylcyclohexene-1 from the product of the reaction zone of step 6 of the process.

5. The process as described in claim 4 wherein the reaction zones of steps 5 and 6 are maintained at a temperature within the range of from about 300° C. to about 375° C.

6. The process as described in claim 4 wherein the contact time of isoprene with ethylene in step 5 and the contact time of 1,3-butadiene with propylene in step 6 are maintained within the range of from about 6 minutes to about 300 minutes.

ALEX G. OBLAD.
EVERETT GORIN.

REFERENCES CITED

The following references are of record in the file of this patent:

UNITED STATES PATENTS

| Number | Name | Date |
|---|---|---|
| 2,339,560 | De Simo et al. | Jan. 18, 1944 |
| 2,349,232 | Joshel | May 16, 1944 |
| 2,404,056 | Gorin et al. | July 16, 1946 |